United States Patent
Ogle et al.

(10) Patent No.: US 10,349,109 B2
(45) Date of Patent: *Jul. 9, 2019

(54) TELEVISION AND SYSTEM AND METHOD FOR PROVIDING A REMOTE CONTROL DEVICE

(71) Applicant: Enseo, Inc., Richardson, TX (US)

(72) Inventors: Vanessa Ogle, Fairview, TX (US);
William C. Fang, Plano, TX (US);
Edward H. Wolfe, Plano, TX (US)

(73) Assignee: Enseo, Inc., Richardson, TX (US)

( * ) Notice: Subject to any disclaimer, the term of this patent is extended or adjusted under 35 U.S.C. 154(b) by 77 days.

This patent is subject to a terminal disclaimer.

(21) Appl. No.: 15/625,224

(22) Filed: Jun. 16, 2017

(65) Prior Publication Data
US 2017/0353755 A1    Dec. 7, 2017

Related U.S. Application Data

(63) Continuation-in-part of application No. 15/422,667, filed on Feb. 2, 2017, now Pat. No. 10,187,685, which
(Continued)

(51) Int. Cl.
*H04N 21/422* (2011.01)
*H04N 5/44* (2011.01)
(Continued)

(52) U.S. Cl.
CPC ......... *H04N 21/4222* (2013.01); *G06F 21/35* (2013.01); *G08C 17/02* (2013.01);
(Continued)

(58) Field of Classification Search
CPC ......... H04N 21/43637; H04N 21/4131; H04N 21/42203; H04N 21/42224;
(Continued)

(56) References Cited

U.S. PATENT DOCUMENTS 6,263,503 B1   7/2001   Margulis
6,741,684 B2   5/2004   Kaars
(Continued)

*Primary Examiner* — Oschta I Montoya
(74) *Attorney, Agent, or Firm* — Scott T. Griggs; Griggs Bergen LLP

(57) ABSTRACT

A television and system and method for providing a remote control device are disclosed. In one embodiment of the television, the television includes a processor, a memory, a tuner, a panel, and an audio driver therein in an interconnected architecture. The television may establish a pairing with a proximate wireless-enabled interactive programmable device, such as a proximate wireless-enabled interactive handheld device having a touch screen display, whereby formatted parallel audiovisual experience instructions, including virtual buttons, may be transmitted to the proximate wireless-enabled interactive programmable device for display on the touch screen display to create an experience parallel to the experience on the television. The television receives and processes virtual remote control functionality input instructions from the proximate wireless-enabled interactive programmable device to control amenities associated with the television.

14 Claims, 4 Drawing Sheets

Related U.S. Application Data is a continuation of application No. 15/162,823, filed on May 24, 2016, now abandoned, which is a continuation of application No. 14/876,571, filed on Oct. 6, 2015, now Pat. No. 9,351,029, which is a continuation of application No. 14/525,392, filed on Oct. 28, 2014, now Pat. No. 9,154,825, which is a continuation of application No. 14/177,876, filed on Feb. 11, 2014, now Pat. No. 8,875,195, which is a continuation of application No. 13/528,663, filed on Jun. 20, 2012, now Pat. No. 8,650,600.

(60) Provisional application No. 62/352,727, filed on Jun. 21, 2016, provisional application No. 61/498,734, filed on Jun. 20, 2011.

(51) Int. Cl.
*H04N 21/41* (2011.01)
*H04N 21/4367* (2011.01)
*G08C 17/02* (2006.01)
*H04W 4/21* (2018.01)
*H04L 29/08* (2006.01)
*G06F 21/35* (2013.01)
*H04W 4/80* (2018.01)

(52) U.S. Cl.
CPC ......... *H04L 67/125* (2013.01); *H04N 5/4403* (2013.01); *H04N 21/4126* (2013.01); *H04N 21/4131* (2013.01); *H04N 21/42202* (2013.01); *H04N 21/42207* (2013.01); *H04N 21/42208* (2013.01); *H04N 21/42224* (2013.01); *H04N 21/42226* (2013.01); *H04N 21/4367* (2013.01); *H04W 4/21* (2018.02); *G08C 2201/20* (2013.01); *G08C 2201/30* (2013.01); *G08C 2201/92* (2013.01); *G08C 2201/93* (2013.01); *H04N 2005/441* (2013.01); *H04N 2005/443* (2013.01); *H04N 2005/4425* (2013.01); *H04N 2005/4426* (2013.01); *H04N 2005/4432* (2013.01); *H04N 2005/4435* (2013.01); *H04N 2005/4442* (2013.01); *H04W 4/80* (2018.02)

(58) Field of Classification Search
CPC ......... H04N 21/42221; H04N 21/2143; H04N 21/42202; H04N 21/633; H04N 21/42207; H04N 21/4222; H04N 21/4367; H04N 21/4221; H04N 5/4403; H04N 2005/4407; H04N 2005/4423; H04N 2005/4428; G08C 2201/30; G08C 2201/92; G08C 2201/20; G08C 2201/93; G08C 17/02
See application file for complete search history.

(56) References Cited

U.S. PATENT DOCUMENTS

| | | | |
|---|---|---|---|
| 7,109,974 B2* | 9/2006 | Kempisty | H04N 5/4403 345/173 |
| 8,286,204 B2 | 10/2012 | Fukuda et al. | |
| 8,650,600 B2 | 2/2014 | Ogle et al. | |
| 8,875,195 B2 | 10/2014 | Ogle et al. | |
| 9,154,825 B2 | 10/2015 | Ogle et al. | |
| 9,351,029 B2 | 5/2016 | Ogle et al. | |
| 2002/0059621 A1 | 5/2002 | Thomas et al. | |
| 2002/0143805 A1 | 10/2002 | Hayes et al. | |
| 2003/0073411 A1 | 4/2003 | Meade | |
| 2005/0005297 A1 | 1/2005 | Lee | |
| 2005/0035846 A1 | 2/2005 | Zigmond et al. | |
| 2005/0097618 A1* | 5/2005 | Arling | H04L 12/2805 725/114 |
| 2005/0108751 A1 | 5/2005 | Dacosta | |
| 2005/0262535 A1 | 11/2005 | Uchida et al. | |
| 2008/0134256 A1* | 6/2008 | DaCosta | H04N 7/17318 725/62 |
| 2010/0082485 A1 | 4/2010 | Lin et al. | |
| 2010/0082491 A1 | 4/2010 | Rosenblatt et al. | |
| 2010/0188279 A1 | 7/2010 | Shamilian et al. | |
| 2011/0007018 A1 | 1/2011 | McKinley et al. | |
| 2011/0067059 A1 | 3/2011 | Johnston et al. | |
| 2016/0150263 A1* | 5/2016 | Patino | H04N 21/4182 725/25 |
| 2016/0269769 A1 | 9/2016 | Ogle et al. | |

* cited by examiner

TELEVISION AND SYSTEM AND METHOD FOR PROVIDING A REMOTE CONTROL DEVICE

PRIORITY STATEMENT & CROSS-REFERENCE TO RELATED APPLICATIONS

This application claims priority from U.S. Application Ser. No. 62/352,727, entitled "Television and System and Method for Providing a Remote Control Device" and filed on Jun. 1, 2016, in the names of Vanessa Ogle et al. This application is also a continuation-in-part of U.S. application Ser. No. 15/422,667, entitled "Set-Top/Back Box, System and Method for Providing a Remote Control Device" filed on Feb. 2, 2017, in the names of Vanessa Ogle et al.; which is a continuation of Ser. No. 15/162,823 entitled "Set-Top/Back Box, System and Method for Providing a Remote Control Device" and filed on May 24, 2016, in the names of Vanessa Ogle et al.; which is a continuation of U.S. patent application Ser. No. 14/876,571 entitled "Set Top/Back Box, System and Method for Providing a Remote Control Device" and filed on Oct. 6, 2015, in the names of Vanessa Ogle et al. and issued on May 24, 2016 as U.S. Pat. No. 9,351,029; which is a continuation of U.S. patent application Ser. No. 14/525,392 entitled "Set Top/Back Box, System and Method for Providing a Remote Control Device" and filed on Oct. 28, 2014, in the names of Vanessa Ogle et al. and issued on Oct. 6, 2015, as U.S. Pat. No. 9,154,825; which is a continuation of U.S. patent application Ser. No. 14/177,876 entitled "Set Top/Back Box, System and Method for Providing a Remote Control Device" and filed on Feb. 11, 2014, in the names of Vanessa Ogle et al, and issued on Oct. 28, 2014, as U.S. Pat. No. 8,875,195; which is a continuation of U.S. application Ser. No. 13/528,663 entitled "Set Top/Back Box, System And Method For Providing A Remote Control Device" and filed on Jun. 20, 2012, in the names of Vanessa Ogle, et al., and issued on Feb. 11, 2014, as U.S. Pat. No. 8,650,600; which claims priority from U.S. Patent Application No. 61/498,734, entitled "Set Top/Back Box, System and Method for Providing a Remote Control Device" and filed on Jun. 20, 2011, in the names of Ogle et al.; which are hereby incorporated by reference for all purposes.

TECHNICAL FIELD OF THE INVENTION

This invention relates, in general, to remote control devices and, in particular, to televisions as well as systems and methods for providing a remote control device for a use in multi-unit environments.

BACKGROUND OF THE INVENTION

Remote controls are now considered a necessity for operating television devices wirelessly from a short line-of-sight distance without the need to approach the television. In multi-unit environments, such as furnished multifamily residences, hotels, and hospitals, for example, remote controls are usually small wireless handheld objects with an array of buttons for adjusting various settings such as television channel and volume. These devices have limited functionality and, as a result, there is a continuing need for improved remote controls.

SUMMARY OF THE INVENTION

It would be advantageous to achieve a remote control for use in a multi-unit environment that would improve upon existing limitations in functionality. It would also be desirable to enable a wireless solution that would mitigate or eliminate the cost of providing remote controls in multi-unit environments. To better address one or more of these concerns, systems and methods, including a television, for providing a remote control device are disclosed. In one embodiment of the television, the television includes a processor, a memory, a tuner, a panel, and an audio driver therein in an interconnected architecture. The television may establish a pairing with a proximate wireless-enabled interactive programmable device, such as a proximate wireless-enabled interactive handheld device having a touch screen display, whereby formatted parallel audiovisual experience instructions, including virtual buttons, may be transmitted to the proximate wireless-enabled interactive programmable device for display on the touch screen display to create an experience parallel to the experience on the television.

The television receives and processes virtual remote control functionality input instructions from the proximate wireless-enabled interactive programmable device to control amenities associated with the television. In one implementation, the television is associated with a multi-unit environment such as a lodging environment and the amenities relate to a guest's stay at the lodging environment. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
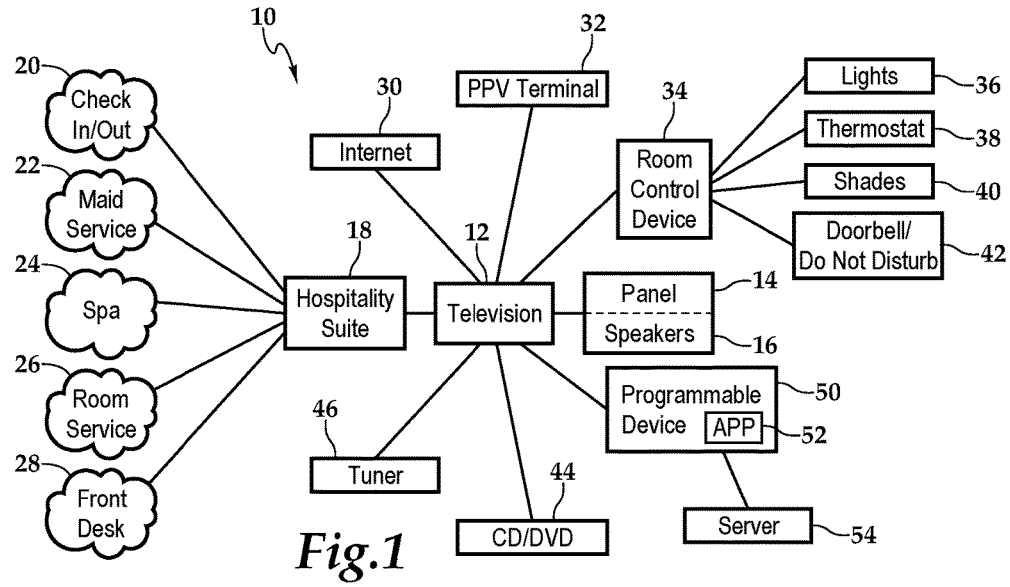
FIG. 1 is a functional block diagram depicting one embodiment of a system for providing a remote control device including a television, according to the teachings presented herein.

Referring initially to FIG. 1, therein is depicted a system for providing a remote control device in a multi-unit environment, such as a furnished multi-family residence, dormitory, lodging establishment, hotel, or hospital, which is schematically illustrated and designate 10. A television 12 having a panel 14 configured to display content and speakers 16 is communicatively disposed with various amenities associated with the multi-unit environment. By way of example, and not by way of limitation, these amenities include a hospitality suite 18, which represents a set of services, including check in/check out 20, maid service 22, spa 24, room service 26, and front desk 28. Additionally, the amenities shown include Internet service 30, a pay-per-view (PPV) terminal 32, and a room control device 34, representing control of the lights 36, thermostat 38, shades 40, and a doorbell/do not disturb designation 42. Other amenities include a CD/DVD player 44 and a radio tuner 46.

As discussed below, the television 12 provides a parallel audiovisual experience related to the content on the panel 14 to a proximate wireless-enabled interactive programmable device 50, which may in turn be used as a virtual remote control to control one or more of the amenities communicatively disposed with the television 12. A proximate wireless-enabled interactive programmable device 50 may be a wireless-enabled interactive handheld device that may be supplied or carried by the guest and may be selected from a range of existing devices, such as, for example iPads®, iPhones®, iPod Touch®, Android® devices, Blackberry® devices, personal computers, laptops, tablet computers, smart phones, and smart watches, for example. As will be discussed in further detail below, in one implementation, an application 52 installed from a server 54 enables the television 12 and the proximate wireless-enabled interactive programmable device 32 to be wirelessly paired. In another embodiment, a challenge-response is utilized to wirelessly pair the television 12 and the proximate wireless-enabled interactive programmable device 50.

Figure 2:
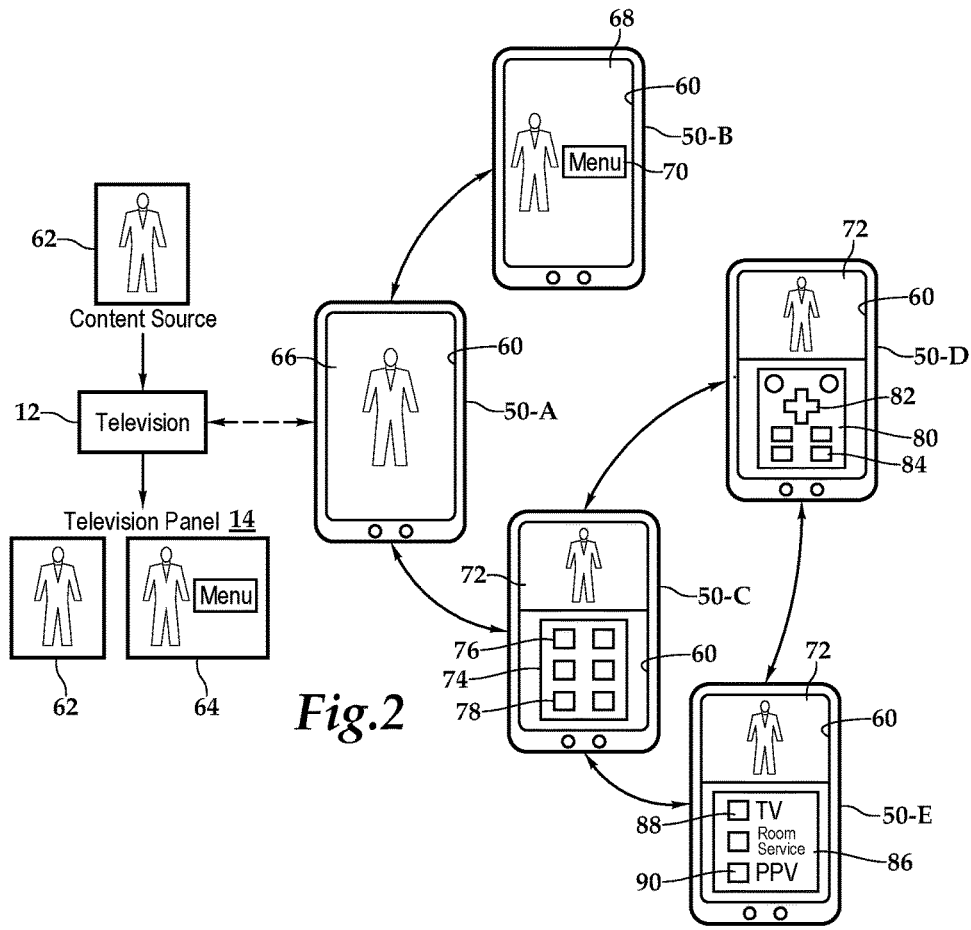
FIG. 2 is a semi-schematic block diagram depicting components of the system presented in FIG. 1 in further detail.

Referring now to FIG. 2, the pairing between the television 12 and the proximate wireless-enabled interactive programmable device 50 having a touch screen display 60 is illustrated in further detail, wherein the alphabetical designations A-E used with proximate wireless-enabled interactive programmable device 50 indicate particular selectable configurations of the proximate wireless-enabled interactive programmable device 50, which are labeled proximate wireless-enabled interactive programmable device 50-A through 50-E. As shown, the television 12 receives content 62 from a source and outputs to the panel 14 either the content 62 or a modified version of the content 62, which includes a menu functionality and is designated content 64. The menu functionality may prompt the user to select between particular services and features offered, which may relate to the previously discussed amenities.

The proximate wireless-enabled interactive programmable device 50-A includes content 66 on the touch screen display 60, which corresponds to content 62 on the television 44. As will be discussed in further detail below, the content 66 is formatted and/or scaled for the touch screen display 60. The proximate wireless-enabled interactive programmable device 50-B includes content 68, which is a formatted and/or scaled version of content 64, on the touch screen display 60. The content 68 includes a virtual button 70 that if pressed by a user causes the corresponding functionality to the menu button 70 to occur. More specifically, the television 12 receives a virtual remote control functionality instruction from the proximate wireless-enabled interactive programmable device 50-B, which indicates that on touch screen 60 coordinates $(X_{PD}, Y_{PD})$ a touch-and-click operation occurred. The television 12 translates or de-scales the coordinates $(X_{PD}, Y_{PD})$ to coordinates $(X_{STB}, Y_{STB})$, which the television 12 compares against a configuration profile in order to determine that the actuation of the menu button 70 presents a pay-per-view terminal guide listing. The television 12 then sends a command signal to the PPV terminal 32 and the requested guide is then displayed.

The proximate wireless-enabled interactive programmable device 50-C includes content 72 on the touch screen display 60. The content 72 corresponds to the content 62, however, the content 72 is formatted and/or scaled for viewing on only an upper portion of the touch screen display 60. A virtual remote control 74 is displayed on lower portion of the touch screen display 60. The virtual remote control 74 controls the CD/DVD player via virtual buttons, including virtual buttons 76, 78. Similar to the actuation of the menu button 70 with proximate wireless-enabled interactive programmable device 50-B, the television 12 receives a virtual remote control functionality instruction from the proximate wireless-enabled interactive programmable device 50-C, which indicates that on touch screen display 60 coordinates $(X_{PD}, Y_{PD})$ a touch-and-click operation occurred. The television 12 translates or de-scales the coordinates $(X_{PD}, Y_{PD})$ to coordinates $(X_{STB}, Y_{STB})$, which the television 12 compares against a configuration profile in order to determine that the actuation of the button 76 initiates playing music on the CD/DVD player 44. The television 12 then sends a command signal to the CD/DVD player 44 and music is played. The proximate wireless-enabled interactive programmable device 50-D having virtual remote control 80 for television 44 control with buttons 82, 84 and the proximate wireless-enabled interactive programmable device 50-E for television 12 control having virtual remote control 86 with buttons 88, 90 have similar functionality to the proximate wireless-enabled interactive programmable device 50-B and 50-C. In one implementation, a user may toggle between the full screen television presentation of the programmable device 50-A and the split screen television/remote presentation of the proximate wireless-enabled interactive programmable device s 50-B through 50-E by selectively swiping or clicking a predetermined portion of the touch screen display 60. Once in the split screen television/remote presentation, the user may selectively switch between an array of virtual remote controls corresponding to the configuration profile in the television 12, which correspond to the various amenities in the multi-unit environment.

Figure 3:
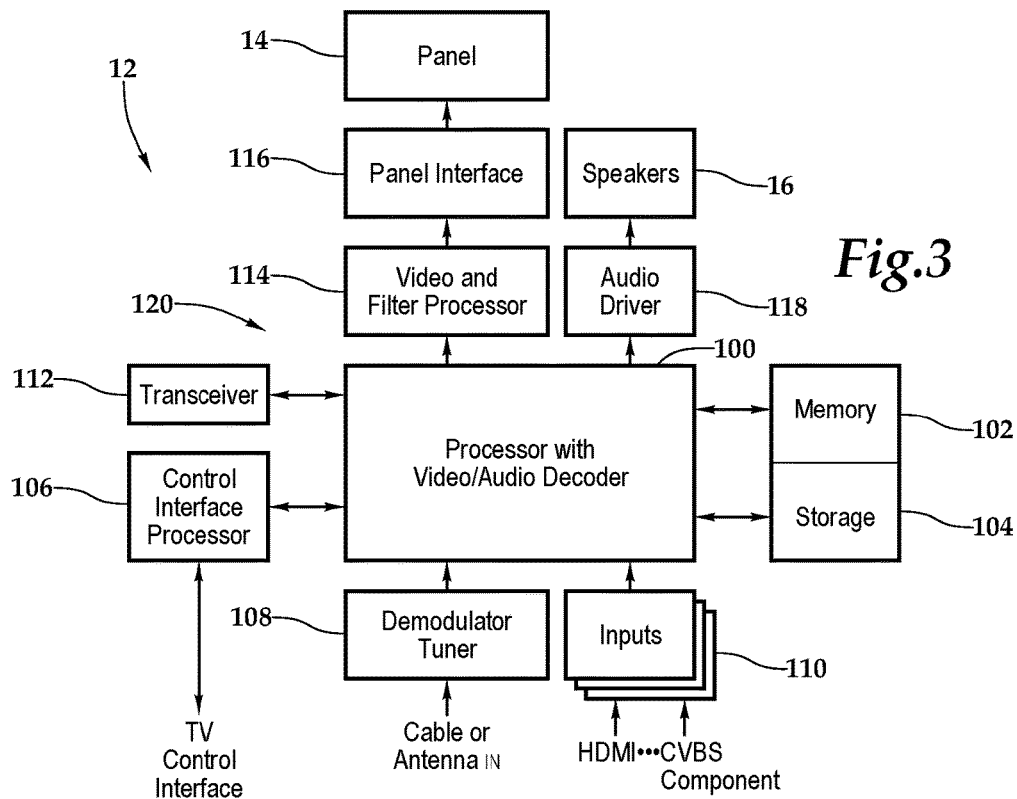
FIG. 3 is a functional block diagram depicting one embodiment of the television shown in FIG. 1.

Referring now to FIG. 3, the television 12 may be a telecommunication medium used for transmitting sound with moving images in black-and-white or color in two or three dimensions. As used herein, television may refer to a television set or a display operating with television functionality. By way of further example, as used herein, television may include smart televisions, sometimes referred to as connected televisions or hybrid televisions, that include televisions having convergent functionality with computers and set-top boxes, including integrated Internet features. Such smart televisions may provide traditional broadcasting media as well as Internet television, online interactive media, over-the-top content, as well as on-demand streaming media, for example. As shown, the television 12 includes a processor 100 with video/audio decoder having memory 102, storage 104, a control interface processor 106, and a transceiver 112 connected therewith. A demodulator tuner 108 provides an input as do inputs 110. The processor 100 drives a signal to the video and filter processor 114, which in turn, drives a signal to a panel interface 116 and onto the panel 14, which may serve as a display. Additionally, the processor 100 drives a signal to the audio driver 118, which in turn, drives a signal to speakers 16.

The processor 100 with video/audio decoder may process instructions for execution within the computing device, including instructions stored in the memory 102 or in the storage 104. In one embodiment, the video/audio decoder functionality of the processor 100 provides for the conversion of base-band analog video signals to digital components video while allowing programmable control over video characteristics such as hue, contrast, and saturation. The memory 102 stores information within the computing device, as shown, the television 12. In one implementation, the memory 102 is a volatile memory unit or units. In another implementation, the memory 102 is a non-volatile memory unit or units. Storage 104 provides capacity that is capable of providing mass storage for the television 12.

In one implementation, the control interface processor 106 may execute instructions relative to a self-diagnosis television control interface. Further, the self-diagnosis interface may be selected from RJ25 ports, RS232 ports, RS422 ports, RS485 ports, multiple protocol interfaces (MPIs), and multiple television interfaces (MTIs), for example. As depicted, the control interface may include an RS232 standard DB-25 connection for the serial communication transmission of data. Such a connection formally defines the signals connecting between a DTE (data terminal equipment) such as a computer terminal, and a DCE (data circuit-terminating equipment, originally defined as data communication equipment.

The demodulator tuner 108 recovers the information content from a modulated carrier wave received from cable or an antenna, for example, and appropriately adjusts the resonance frequency of the received modulated carrier wave for further processing by the processor. As discussed, various inputs 110 provide connections to the television 12, wherein the inputs 110 are the signals or data received by the television 12. In the illustrated example, the inputs 110 may include an HDMI interface or CVBS component, for example. The transceiver 112 is associated with the television 12 and communicatively disposed with the architecture. As shown the transceiver 112 may be internal, external, or a combination thereof with respect to the housing of the television 12. Communication between various amenities in the hotel room, including even the remote control 30, and the television 12 may be enabled by a variety of wireless methodologies employed by the transceiver 112, including 802.11, 3G, 4G, Edge, Wi-Fi, ZigBee, near field communications (NFC), Bluetooth low energy and Bluetooth, for example. Also, infrared (IR) may be utilized.

The video and filter processor 114 performs a complete or partial suppression of some aspect of the signal received from the processor 100 in order to remove some frequencies to suppress interfering signals and reduce background noise and adjust image quality. The panel interface 116 specifies a video connection and signaling that drives the panel 14, which may be a liquid crystal display, plasma panel, electroluminescent panel, or organic light-emitting diode panel, for example. The audio driver 118 specifies the audio connection and signaling that drives an electrical audio signal to the speakers, which convert the electrical audio signal into a corresponding sound.

As described, the television 12 is associated with a room and includes, a processor 120, memory 102, a tuner shown as demodulator tuner 108, a panel 14 and an audio driver 118 therein in an interconnected architecture. It should be appreciated that although a particular architecture is shown, the teachings prescribed herein are applicable to other architectures. By way of example, the processors 100, 106, and 114 may be partially or fully integrated and represented as the processor 120. The memory 102 and storage 104 are accessible to the processor 120 and include processor-executable instructions that, when executed, cause the processor 120 to execute a series of operations. As mentioned, communication between the proximate wireless-enabled interactive programmable device 50 and the television 12 may be enabled by a variety of wireless methodologies, including 802.11, 3G, 4G, Edge, Wi-Fi, ZigBee, near field communications (NFC), and Bluetooth, for example. Also, infrared (IR) may utilized. If direct communication is not possible, communication between the proximate wireless-enabled interactive programmable device and the television may be made through indirect communication protocols. For example, a proxy service may be used to route messaging to the interactive device by way of the Internet or 802.11 communication.

The processor-executable instructions establish a pairing between the amenities and the television 12 such that the television 12 is configured to control each of the amenities in the multi-unit environment. The processor-executable instructions specify a search operation to identify the proximate wireless-enabled interactive handheld device 50. This search operation utilizes the at least one or more wireless transceivers 112 to wirelessly identify the proximate wireless-enabled interactive programmable device 50. As previously discussed, the proximate wireless-enabled interactive programmable device 50 may include an application which assists in the searching or alternatively a NFC protocol may be utilized for identification. In a further non-limiting variation, a BlueTooth challenge-response is utilized or instructions on a gateway television page are presented. In many embodiments of the search methodology, physical proximity between the proximate wireless-enabled interactive programmable device 50 and the television 12 is leveraged to establish a pairing therebetween.

The processor-executable instructions also establish a pairing between the proximate wireless-enabled interactive programmable device 50 and the television 12. Additionally, the processor-executable instructions send parallel audiovisual experience instructions to the proximate wireless-enabled interactive programmable device 50. This enables the parallel audiovisual experience on the proximate wireless-enabled interactive programmable device 50. The instructions may include instructions for virtual buttons on the touch screen display 60. The virtual buttons are associated with a particular amenity, as previously discussed. Standard remote control functionality input instructions are embodied as virtual remote control functionality input instructions to be received and processed by the television 12 from the proximate wireless-enabled interactive programmable device 50. The virtual remote control functionality input instructions received from the proximate wireless-enabled interactive programmable device are processed based on the location of a touch-and-click operation on the touch screen display. The location of the touch-and-click operation is translated by the television 12 into a command associated with an amenity based on the location of the touch-and-click operation and the parallel audiovisual experience instructions provided to the proximate wireless-enabled interactive programmable device 50.

The configuration profile is associated with the memory 102 and processor-executable instructions that enable the television 12 to control the amenities in the multi-room environment. The configuration profile, for each amenity, includes instructions for virtual buttons on the touch screen display, and instructions for associating virtual remote control functionality input instructions from the touch screen display with commands that are handled by the television 12.

Figure 4:
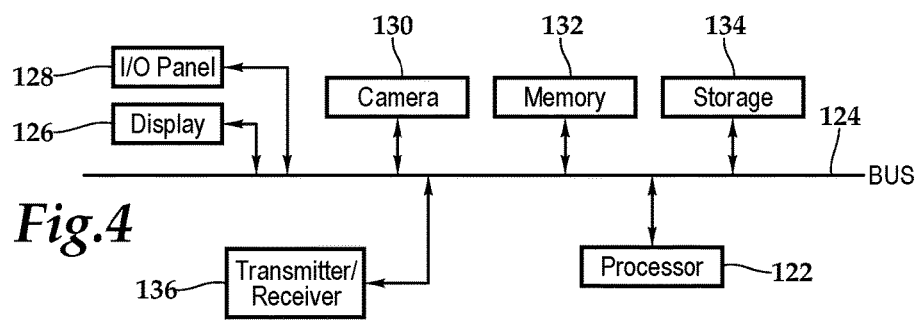
FIG. 4 is a functional block diagram depicting the proximate wireless-enabled interactive programmable device, a component of the system presented in FIG. 1.

Referring now to FIG. 4, the proximate wireless-enabled interactive programmable device 50 may be a wireless communication device of the type including various fixed, mobile, and/or portable devices. To expand rather the limit the previous discussion of the proximate wireless-enabled interactive programmable device 50, such devices may include, but are not limited to, cellular or mobile telephones, two-way radios, personal digital assistants, digital music players, Global Position System units, and so forth. The proximate wireless-enabled interactive programmable device 50 may include processor 122, bus 124, display 126, I/O panel 128, a camera 130, memory 132, storage 134 and a transmitter/receiver 136. It should be appreciated that although a particular architecture is explained, other designs and layouts are within the teachings presented herein.

In operation, the teachings presented herein permit a proximate wireless-enabled interactive programmable device 50 such as a smart phone, tablet or laptop to be utilized as an intelligent remote control device to interactively communicate with a television that operates the television and/or room automation in a multi-dwelling environment. Additionally, the systems and methods presented herein may be employed by an installer or maintenance staff worker to create an interactive tool for the deployment, diagnosis and maintenance of a television.

In the operation embodiment being described, the proximate wireless-enabled interactive programmable device 50 may be "paired" on a temporary basis to the television for use during the stay of an occupant. The proximate wireless-enabled interactive programmable device 50 may communicate via the television 12 with the television, a property management system or customer relationship management solution to be automatically configured for VIP guests and to clear settings after check-out for privacy.

The system and method may provide a menu-driven environment which may duplicate content on the television, provide related content, furnish a parallel experience, or provide controls for the environment in the room. For example, with respect to the parallel experience, a channel guide may be provided. Byway of another example, providing controls for the environment may include enabling the thermostat and lighting controls from the interactive device by way of the television.

Thus, the systems and methods disclosed herein may enable users to use existing electronic devices as a temporary remote control device to control a television via a television. Therefore the systems and methods presented herein avoid the need for additional or expensive high functionality remote controls. In this respect, the teachings presented herein also include providing the software and/or application for the electronic device or interactive handheld device. The application, to the extent needed, may be downloaded from the Internet or alternatively made available by download from the television.

Figure 5:
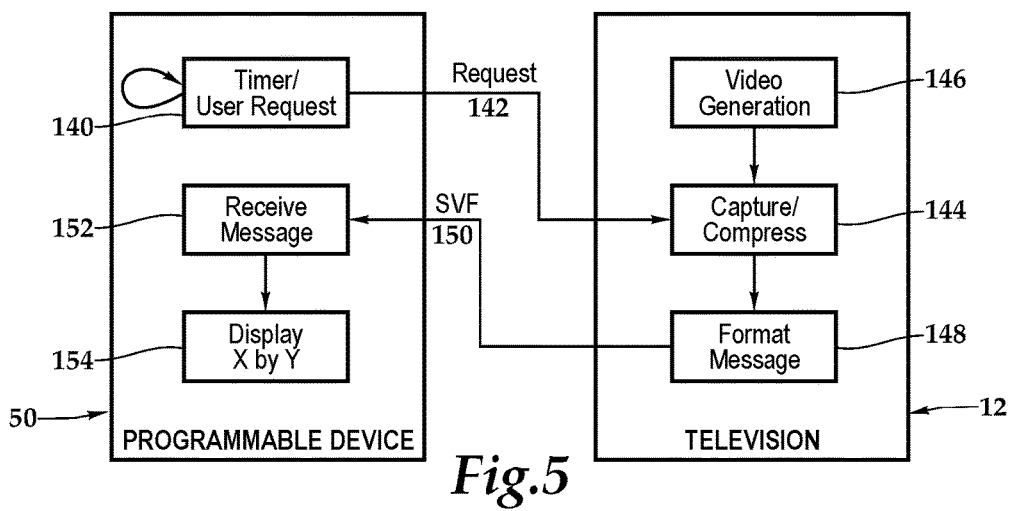
FIG. 5 is a functional flow diagram depicting one embodiment of single frame signaling between the television and the proximate wireless-enabled interactive programmable device.

Referring to FIG. 5, one embodiment of single frame signaling between the television 12 and the proximate wireless-enabled interactive programmable device 50 is depicted. At operational module 140, a timer or user request generates a request 142 from the proximate wireless-enabled interactive programmable device 50, which is received by the capture/compress module 144 at the television 12. The operational module 144 responsive thereto, receives a video generation signal from the operational module 146, which is $F_{output}(X_{STB}, Y_{STB})$. This signal is forwarded to operational module 148, where the signal is formatted and/or scaled for the particular proximate wireless-enabled interactive programmable device 50, based on the pairing established between the television 12 and the proximate wireless-enabled interactive programmable device 50. That is, the operational module 148 formats and/or scales the signal from $F_{output}(X_{STB}, Y_{STB})$, with individual pixels being $(X_{STB}, Y_{STB})$, to $F_{device}(X_{PD}, Y_{PD})$, with individual pixels being $(X_{PD}, Y_{PD})$. The formatted and/or scaled signal $F_{device}(X_{PD}, Y_{PD})$ is sent via signal video frame (SVF) signal 150 from the television 12 and received at operational module 152, where the signal and message are received and displayed at operational module 154 on the touch screen display 60 of the proximate wireless-enabled interactive programmable device 50. In this manner, parallel audiovisual experience instructions are provided by the television 12 to the proximate wireless-enabled interactive programmable device 50 to create a parallel experience, which as discussed previously, may include virtual buttons. It should be appreciated that the various operational modules described in FIG. 4 and herein may be executed by the hardware, software, and firmware architectures depicted in FIG. 3, for example.

Figure 6:
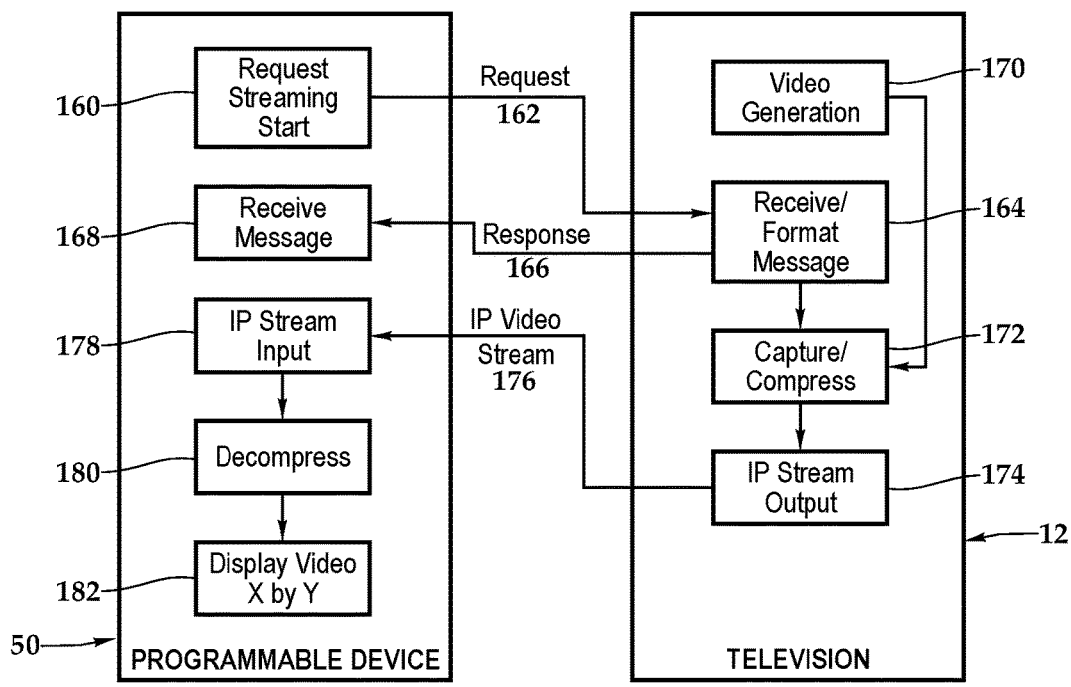
FIG. 6 is a functional flow diagram depicting one embodiment of streaming video between the television and the proximate wireless-enabled interactive programmable device.

FIG. 6 depicts one embodiment of streaming video between the television 12 and the proximate wireless-enabled interactive programmable device 50. At operational module 160 a request 162 originates from the proximate wireless-enabled interactive programmable device 50 and is received by operational module 164, where the message is received and a response 166 is transmitted back to the proximate wireless-enabled interactive programmable device 50, indicating that the parameters. The response 166 is received at operational module 168. With reference again to the television 12, an operational module 170 generates the streaming video, which is captured and compressed at operational module 172, prior to being formatted, in one embodiment, as an IP stream output at operational module 174. After transmission from the television 12, the IP video stream 176 is received by the proximate wireless-enabled interactive programmable device at operational module 178, and then decompressed at operational module 180 prior to being displayed at operational module 182. Similar to the discussion in FIG. 4, the formatting and scaling involves transforming $F_{output}(X_{STB}, Y_{STB})$, with individual pixels being $(X_{STB}, Y_{STB})$, to $F_{device}(X_{PD}, Y_{PD})$ with individual pixels being $(X_{PD}, Y_{PD})$ and reflecting a substantially real-time stream rate. In this manner, parallel audiovisual experience instructions are provided by the television 12 to the proximate wireless-enabled interactive programmable device 50 to create a parallel experience, which as discussed previously, may include virtual buttons.

Figure 7:
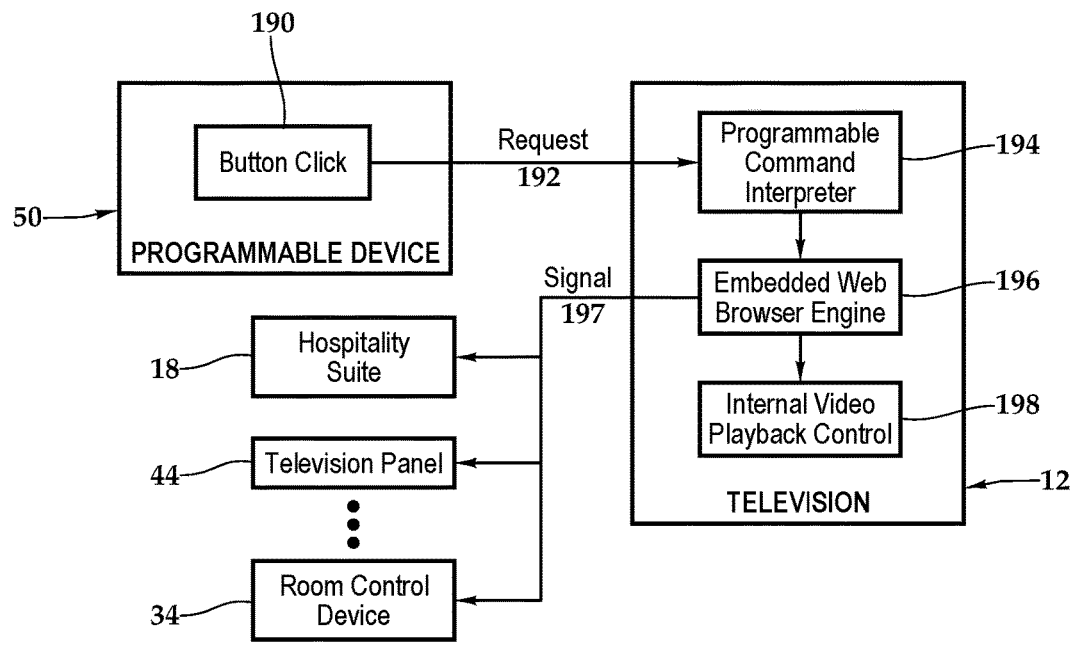
FIG. 7 is a functional flow diagram depicting one embodiment of control signaling between the television and the proximate wireless-enabled interactive programmable device.

FIG. 7 depicts one embodiment of control signaling between the television 12 and the proximate wireless-enabled interactive programmable device 50. At the proximate wireless-enabled interactive programmable device, a button click or touch-and-click operation is detected at operational module 190, which then sends request 192. The button click may be associated with the actuation of a virtual button, which forms a portion of the parallel audiovisual experience. The television 12 receives the request 192 and operational module 194 executes a programmable command interpreter based on a configuration profile to determine the individual pixels ($X_{STB}$, $Y_{STB}$) associated with touch-and-click operation at ($X_{PD}$, $Y_{PD}$). Based on the parallel audiovisual instructions sent from the television 12 and the received location of the touch-and-click operation, the operational module 194 determines the command and amenity associated with the actuation of the virtual button actuation on the proximate wireless-enabled interactive programmable device 50. In the particular illustrated embodiment, at operational module 196, an embedded web browser engine 196, working with operational module 198, which handles internal video playback control, forwards a command signal 197 to the appropriate amenity.

Figure 8:
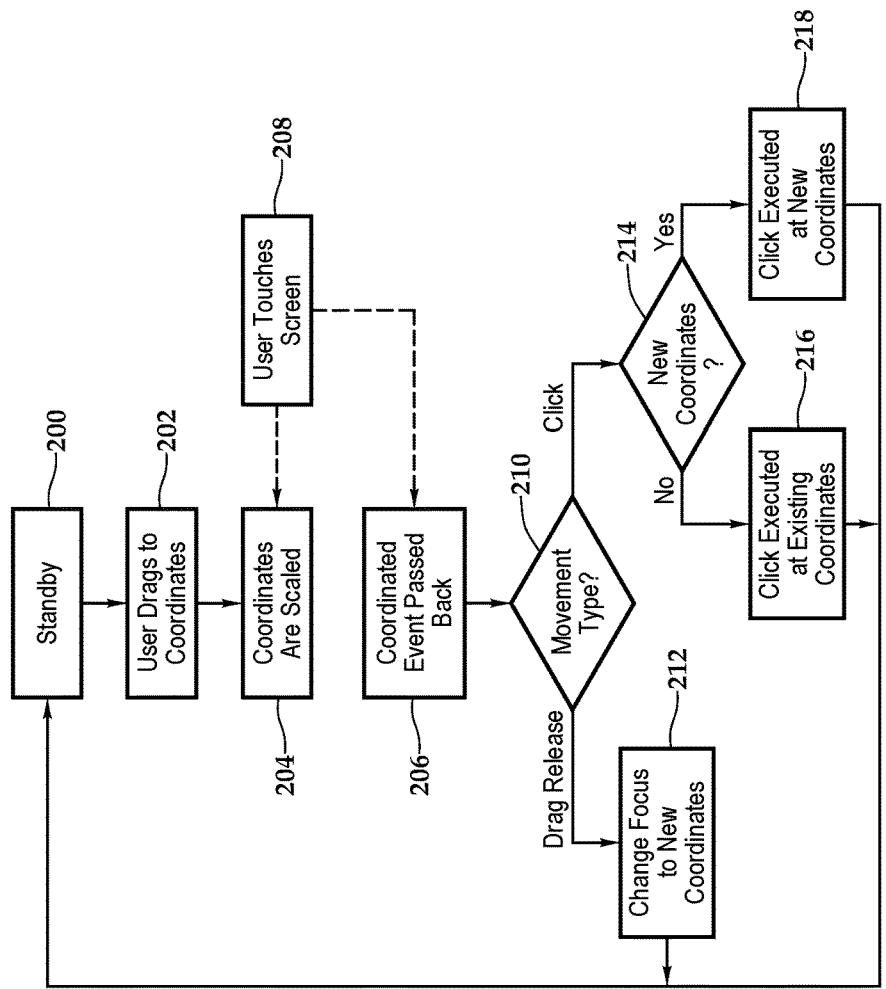
FIG. 8 is a flow chart diagram depicting one embodiment of a method for user touch panel display command execution.

FIG. 8 depicts one embodiment of a method for user touch panel display command execution. At block 200, the methodology is in standby. At block 202, a user drags his or her finger to particular coordinates on the touch screen display of the proximate wireless-enabled interactive programmable device. At block 204, the event is transmitted from the proximate wireless-enabled interactive programmable device and received by the television, where the coordinates are translated from the proximate wireless-enabled interactive programmable device coordinates to the television coordinates. At block 206, the event is passed back to the proximate wireless-enabled interactive programmable device and continued to be monitored. As shown by the dashed lies from block 208, it should be understood that during this process the user may continue to touch the screen.

At decision block 210, the movement type is determined and if a drag release occurred, then the focus of the methodology changes to the new coordinates. On the other hand, if a click movement occurs, then at decision block 214, the methodology forms a tree depending on whether or not the click occurred at existing coordinates (block 216) or new coordinates (block 218). These events are monitored for proper reporting to the television 12 from the proximate wireless-enabled interactive programmable device 50 of the location and type of touch-and-click operation, which may include a drag and/or release, occurs.

Figure 9:
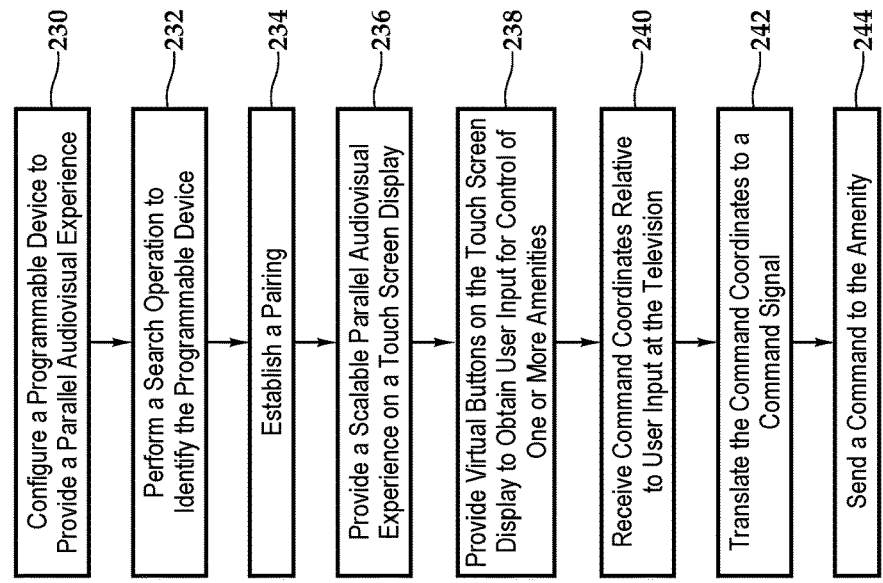
FIG. 9 is a flow chart depicting one embodiment of a method for providing a remote control device, according to the teachings presented herein.

FIG. 9 depicts one embodiment of a method for providing a remote control device, according to the teachings presented herein. At block 230, the proximate wireless-enabled interactive programmable device is configured to provide a parallel audiovisual experience. In one implementation, this may involve using an existing application on the proximate wireless-enabled interactive programmable device, such as a browser, or downloading a new application. At block 232, a search, which may be active or passive, is performed by the television to identify a physically proximate wireless-enabled interactive programmable device in the multi-room environment. At block 234, a pairing is established prior to a scalable parallel audiovisual experience being provided at block 236 on the touch screen display of the proximate wireless-enabled interactive programmable device. The audiovisual experience is parallel to the television experience being provided by the television. As noted by block 238, this experience may include providing virtual buttons integrated within the audiovisual experience or two or more panels within the touch screen display showing the television experience and one or more virtual remote controls. As previously discussed, the virtual remote controls and buttons each correspond to amenities under the control of the television.

At block 240, command coordinates are received from the proximate wireless-enabled interactive programmable device at the television and these command coordinates are translated into a command signal intended for an amenity associated with the television based on the location of the touch-and-click operation, which more generally may be understood as a user interaction, and the parallel experience being provided by the television to the proximate wireless-enabled interactive programmable device. At block 244, the command is sent from the television to the amenity.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A television comprising:
   a wireless transceiver configured to communicate with a proximate wireless-enabled interactive handheld device;
   a processor, the wireless transceiver, memory, a tuner, a panel configured to display content, and an audio driver disposed in an interconnected architecture;
   the memory accessible to the processor, the memory including processor-executable instructions that, when executed, cause the processor to:
   specify a search operation to identify the proximate wireless-enabled interactive handheld device, wherein the search operation utilizes the wireless transceiver to wirelessly identify the proximate wireless-enabled interactive handheld device,
   establish a pairing between the proximate wireless-enabled interactive handheld device and the television,
   send formatted parallel audiovisual experience instructions to the proximate wireless-enabled interactive handheld device, wherein the formatted parallel audiovisual experience instructions are operable to provide a parallel experience related to the content on the panel,
   provide instructions for virtual buttons on a touch screen display associated with the proximate wireless-enabled interactive handheld device, the virtual buttons being associated with a particular amenity,
   receive and process virtual remote control functionality input instructions from the proximate wireless-enabled interactive handheld device, and
   send a command to the particular amenity;
   a configuration profile associated with the memory and processor-executable instructions that enables the set-top box to control a plurality of proximate amenities in a multi-room environment, the plurality of proximate amenities including the particular amenity, the plurality of proximate amenities being associated with a user's stay in the lodging environment;

the configuration profile, for each amenity of the plurality of amenities, including instructions for virtual buttons on a touch screen display, and instructions for associating virtual remote control functionality input instructions from the touch screen display with commands; and wherein the formatted parallel audiovisual experience instructions include instructions that scale an image on the television to a first portion of the touch screen display on the proximate wireless-enabled interactive handheld device, wherein the formatted parallel audiovisual experience instructions include instructions that selectively display one or more sets of virtual buttons on a second portion of the touch screen display, the one or more sets of virtual buttons corresponding to the plurality of amenities.

2. The television as recited in claim 1, wherein the one or more wireless transceivers are configured to communicate with a standard selected from the group consisting of infrared (IR), 802.11, 3G, 4G, Edge, Wi-Fi, ZigBee, near field communications (NFC), and Bluetooth.

3. The television as recited in claim 1, wherein the formatted parallel audiovisual experience instructions include instructions that scale an image on the television to the touch screen display on the proximate wireless-enabled interactive handheld device.

4. The television as recited in claim 1, wherein the formatted parallel audiovisual experience instructions include instructions that scale, on a frame-by-frame basis, an image on the television to the touch screen display on the proximate wireless-enabled interactive handheld device.

5. The television as recited in claim 1, wherein the formatted parallel audiovisual experience instructions include instructions that scale, on a streaming basis, an image on the television to the touch screen display on the proximate wireless-enabled interactive handheld device.

6. The television as recited in claim 1, wherein the formatted parallel audiovisual experience instructions include instructions that display virtual buttons on a second portion of the touch screen display.

7. The television as recited in claim 1, wherein the plurality of amenities comprise of amenities selected from the group consisting of CD/DVD players, tuners, hospitality suite services, Internet service, pay-per-view terminals, room control devices, and televisions.

8. The television box as recited in claim 1, wherein the processor being caused to receive and process virtual remote control functionality input instructions from the proximate wireless-enabled interactive handheld device further comprises receiving and processing the location of a touch-and-click operation on the touch screen display.

9. A television comprising:
a wireless transceiver configured to communicate with a proximate wireless-enabled interactive handheld device;
a processor, the wireless transceiver, memory, a tuner, a panel configured to display content, and an audio driver disposed in an interconnected architecture;
the memory accessible to the processor, the memory including processor-executable instructions that, when executed, cause the processor to:
establish a pairing between the proximate wireless-enabled interactive programmable device and the television,
send formatted parallel audiovisual experience instructions to the proximate wireless-enabled interactive handheld device, wherein the formatted parallel audiovisual experience instructions are operable to provide a parallel experience related to the content on the television,
receive and process virtual remote control functionality input instructions from the proximate wireless-enabled interactive programmable device based on the location of a touch-and-click operation on the touch screen display,
translate the location of the touch-and-click operation into a command associated with an amenity in the multi-room environment based on the location of the touch-and-click operation and the parallel audiovisual experience instructions,
send the command to the amenity; and
wherein the formatted parallel audiovisual experience instructions include instructions that scale an image on the television to a first portion of the touch screen display on the proximate wireless-enabled interactive handheld device;
wherein the formatted parallel audiovisual experience instructions include instructions that selectively display one or more sets of virtual buttons on a second portion of the touch screen display, the one or more sets of virtual buttons corresponding to the plurality of amenities;
wherein the plurality of amenities comprise of amenities selected from the group consisting of CD/DVD players, tuners, hospitality suite services, Internet service, pay-per-view terminals, room control devices, and televisions; and
wherein the formatted parallel audiovisual experience instructions include instructions that scale, on a frame-by-frame basis, an image on the television to the touch screen display on the proximate wireless-enabled interactive handheld device.

10. The television as recited in claim 9, wherein the formatted parallel audiovisual experience instructions include instructions that scale, on a streaming basis, an image on the television to the touch screen display on the proximate wireless-enabled interactive handheld device.

11. A television comprising:
a wireless transceiver configured to communicate with a proximate wireless-enabled interactive handheld device;
a processor, the wireless transceiver, memory, a tuner, a panel configured to display content, and an audio driver disposed in an interconnected architecture;
the memory accessible to the processor, the memory including processor-executable instructions that, when executed, cause the processor to:
establish a pairing between a plurality of amenities and the television such that the television is configured to control each of the plurality of amenities, the plurality of amenities being associated with the multi-unit environment,
establish a pairing between the proximate wireless-enabled interactive programmable device and the television,
send formatted parallel audiovisual experience instructions to the proximate wireless-enabled interactive programmable device, wherein the formatted parallel audiovisual experience instructions are operable to provide a parallel experience related to the content on the television, receive and process virtual remote control functionality input instructions from the proximate wireless-enabled interactive programmable device based on the location of a touch-and-click operation on the touch screen display, translate the location of the touch-and-click operation into a command associated with one of the plurality of amenities based on the location of the touch-and-click operation and the parallel audiovisual experience instructions, send the command to the one of the plurality of amenities; and wherein the formatted parallel audiovisual experience instructions include instructions that scale an image on the television to a first portion of the touch screen display on the proximate wireless-enabled interactive handheld device;

wherein the formatted parallel audiovisual experience instructions include instructions that selectively display one or more sets of virtual buttons on a second portion of the touch screen display, the one or more sets of virtual buttons corresponding to the plurality of amenities;

wherein the plurality of amenities comprise of amenities selected from the group consisting of CD/DVD players, tuners, hospitality suite services, Internet service, pay-per-view terminals, room control devices, and televisions; and wherein the formatted parallel audiovisual experience instructions include instructions that scale, on a frame-by-frame basis, an image on the television to the touch screen display on the proximate wireless-enabled interactive handheld device.

12. The television as recited in claim 11, wherein the formatted parallel audiovisual experience instructions include instructions that scale, on a streaming basis, an image on the television to the touch screen display on the proximate wireless-enabled interactive handheld device.

13. A television comprising:
a wireless transceiver configured to communicate with a proximate wireless-enabled interactive handheld device;
a processor, the wireless transceiver, memory, a tuner, a panel configured to display content, and an audio driver disposed in an interconnected architecture;
the memory accessible to the processor, the memory including processor-executable instructions that, when executed, cause the processor to:
establish a pairing between a plurality of amenities and the television such that the television is configured to control each of the plurality of amenities, the plurality of amenities being associated with the multi-unit environment, establish a pairing between the proximate wireless-enabled interactive programmable device and the television, send formatted parallel audiovisual experience instructions to the proximate wireless-enabled interactive programmable device, wherein the formatted parallel audiovisual experience instructions are operable to provide a parallel experience related to the content on the television, send instructions for virtual buttons to the proximate wireless-enabled interactive programmable device, the virtual buttons being associated with one of the plurality of amenities, receive and process virtual remote control functionality input instructions from the proximate wireless-enabled interactive programmable device based on the location of a touch-and-click operation on the touch screen display, translate the location of the touch-and-click operation into a command associated with one of the plurality of amenities based on the location of the touch-and-click operation and the parallel audiovisual experience instructions, send the command to the one of the plurality of amenities; and wherein the formatted parallel audiovisual experience instructions include instructions that scale an image on the television to a first portion of the touch screen display on the proximate wireless-enabled interactive handheld device;

wherein the formatted parallel audiovisual experience instructions include instructions that selectively display one or more sets of virtual buttons on a second portion of the touch screen display, the one or more sets of virtual buttons corresponding to the plurality of amenities;

wherein the plurality of amenities comprise of amenities selected from the group consisting of CD/DVD players, tuners, hospitality suite services, Internet service, pay-per-view terminals, room control devices, and televisions; and wherein the formatted parallel audiovisual experience instructions include instructions that scale, on a frame-by-frame basis, an image on the television to the touch screen display on the proximate wireless-enabled interactive handheld device.

14. The television as recited in claim 13, wherein the formatted parallel audiovisual experience instructions include instructions that scale, on a streaming basis, an image on the television to the touch screen display on the proximate wireless-enabled interactive handheld device.

* * * * *